(12) United States Patent
Furukawa et al.

(10) Patent No.: US 6,834,080 B1
(45) Date of Patent: Dec. 21, 2004

(54) VIDEO ENCODING METHOD AND VIDEO ENCODING APPARATUS

(75) Inventors: Rieko Furukawa, Yokohama (JP); Takeshi Nagai, Kawasaki (JP); Yoshihiro Kikuchi, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 840 days.

(21) Appl. No.: 09/655,452

(22) Filed: Sep. 5, 2000

(51) Int. Cl.[7] .......................... H04N 7/12; H04N 11/02; H04N 11/04
(52) U.S. Cl. ......................... 375/240.02; 375/240.24; 375/240.26; 375/240.27; 375/240.16; 348/699; 348/700
(58) Field of Search ...................... 375/240.02, 240.27, 375/240.16, 270.24, 240.26; 348/699, 700

(56) References Cited

U.S. PATENT DOCUMENTS

| | | | |
|---|---|---|---|
| 5,241,383 A | | 8/1993 | Chen et al. |
| 5,835,149 A | | 11/1998 | Astle |
| 5,847,766 A | | 12/1998 | Peak |
| 5,872,598 A | * | 2/1999 | Legall et al. .......... 375/240.04 |
| 6,072,542 A | * | 6/2000 | Wilcox et al. ............... 348/722 |
| 6,100,940 A | * | 8/2000 | Dieterich .................... 348/700 |
| 6,101,278 A | | 8/2000 | Chen et al. |
| 6,252,975 B1 | * | 6/2001 | Bozdagi et al. ............. 382/107 |
| 6,256,419 B1 | * | 7/2001 | Nagasaka et al. ........... 382/236 |
| 6,278,446 B1 | * | 8/2001 | Liou et al. ................... 345/700 |
| 6,389,168 B2 | * | 5/2002 | Altunbasak et al. ........ 382/224 |
| 6,462,754 B1 | * | 10/2002 | Chakraborty et al. ....... 345/723 |
| 6,473,459 B1 | * | 10/2002 | Sugano et al. .......... 375/240.16 |

FOREIGN PATENT DOCUMENTS

| | | |
|---|---|---|
| EP | 0 500 077 | 8/1992 |
| EP | 0 549 470 | 6/1993 |
| EP | 0 618 733 | 10/1994 |
| EP | 0 720 379 | 7/1996 |
| EP | 0 587 397 | 5/2000 |
| JP | 10-304372 | 11/1998 |
| JP | 10-336675 | 12/1998 |
| JP | 11-177989 | 7/1999 |

OTHER PUBLICATIONS

V. Kobla, et al., IEEE Workshop on Multimedia Signal Processing, pp. 337–342, Extraction of Features for Indexing MPEG–Compressed Video, Jun. 23, 1997.

Boon–Lock Yeo, et al., IEEE Transactions on Circuits and Systems for Video Technology, vol. 5, No. 6, pp. 533–544, "Rapid Scene Analysis on Compressed Video", Dec. 1995.

Chee Sun Won, et al., SPIE, vol. 3312, pp. 426–435, "Extracting Image Features from MPEG–2 Compressed Stream", Jan. 1998.

* cited by examiner

Primary Examiner—Chris Kelley
Assistant Examiner—Charles E Parsons (57) ABSTRACT

An video encoding method and a video encoding apparatus wherein an input video signal is divided into a plurality of temporally continuous scenes each including at least one frame, statistical feature amounts are calculated for each of the scenes, encoded parameters are generated for each of the scenes based on said statistical feature amounts, and the input image signal is encoded using the encoded parameters.

11 Claims, 8 Drawing Sheets

CASE WHERE MOTION VECTORS HARDLY EXIST

FIG. 7A

CASE WHERE MOTION VECTORS IN SAME DIRECTION AND OF SAME SIZE ARE DISTRIBUTED OVER ENTIRE PICTURE PLANE

FIG. 7B

CASE WHERE MOTION VECTORS LOCALLY APPEAR IN FRAME

FIG. 7C

CASE WHERE MOTION VECTORS ARE RADIALLY DISTRIBUTED IN FRAME

FIG. 7D

CASE WHERE MANY MOTION VECTORS EXIST IN FRAME AND DIRECTIONS OF MOTION VECTORS ARE NOT UNIFORM

VIDEO ENCODING METHOD AND VIDEO ENCODING APPARATUS

BACKGROUND OF THE INVENTION

The present invention relates to a video compression and encoding technology such as an MPEG scheme utilized in a video transmission system and a video database system through the Internet or the like. The present invention particularly relates to a video encoding method and a video encoding apparatus capable of providing a unified decoded video for each scene, which is easy to see without increasing data size, by encoding data in accordance with encoded parameters based on the content of scenes.

The MPEG scheme, which is an international standard for video encoding, is a technique for compressing a video by a combination of motion compensation prediction, discrete cosine transformation and variable length coding, as is well known. The MPEG scheme is described in detail in, for example, Reference 1: "MPEG", The Institute of Television Engineers edition, Ohmsha, Ltd.).

In a conventional video encoding apparatus based on the MPEG scheme, compressed video data is transmitted by a transmission line the transmission rate of which is specified, or recorded on a storage medium the recording capacity of which is limited. Owing to this, a processing referred to as rate control for setting encoding parameters, such as a frame rate and a quantization width, and conducting encoding so that the bit rate of an outputted encoded bit stream can become a designated value. In conventional rate control, a method of determining a frame rate according to the number of generated bits as a result of encoding a previous frame with respect to a fixed quantization width has been often adopted.

Conventionally, a frame rate is determined based on the difference (margin) between a present buffer capacity and a frame skip threshold preset according to the capacity of a buffer in which an encoded bit stream is temporarily stored. If the buffer capacity is lower than the threshold, data is encoded at a fixed frame rate. If the buffer capacity is higher than the threshold, frame skipping is conducted to decrease the frame rate.

With this method, however, if the number of coded bits generated in a previous frame is large, frame skipping is conducted until the buffer capacity becomes not more than the frame skip threshold. Due to this, the distance between the frame and the next frame becomes too wide, with the result that video disadvantageously becomes unnatural.

That is, according to the conventional rate control, the frame rate and the quantization width are basically set irrespectively of the content of a video. For that reason, frame rate become too low on a scene in the video on which an object moves actively and the motion of the object becomes unnatural. Besides, due to the inappropriate quantization width, the picture may be distorted to thereby disadvantageously find it difficult to visually recognize the picture.

In the meantime, there is also known a rate control method based on a technique referred to as two-pass encoding. This technique is described in, for example, Reference 2: Japanese Patent Unexamined Application Publication No. 10-336675. As described in Reference 2, a video file is encoded twice, the overall characteristics of the video file is analyzed by the first encoding, the second encoding is conducted by setting appropriate encoding parameters based on the analysis result and an encoded bit stream obtained as a result of the second encoding is transmitted or recorded. The two-pass encoding, however, has the same problems as those described above since encoding parameters are conventionally, basically set irrespectively of the contents of a video.

As stated above, in the conventional video encoding apparatus, encoding parameters such as the frame rate and the quantization width are set irrespectively of the contents of a video when conducting rate control. Due to this, the frame rate suddenly decreases on a scene in the video on which an object moves actively and the motion of the object becomes unnatural. Also, due to the inappropriate quantization width, the video may be distorted. Thus, the conventional video encoding apparatus has a disadvantage in that the deterioration of picture quality tends to be conspicuous.

BRIEF SUMMARY OF THE INVENTION

It is, therefore, an object of the present invention to provide a video encoding method and a video encoding apparatus capable of encoding a video with picture quality suited for the contents of the scenes of the video while maintaining an encoding bit rate at a designated value.

If compressed video data is recorded on a storage medium of limited storage capacity or downloaded through the Internet, it is important to efficiently encode the data at a frame rate or with a quantization width suitable for a scene as much as possible on the condition of fixed data size. To this end, since the number of generated bits does not always relate to the content of the scene, it is desired that encoded parameters are determined based on the motion of an object on the scene and the content of the scene so as to obtain a clear video.

The present invention provides a video encoding method and a video encoding apparatus for dividing an input video signal into a plurality of temporally continuous scenes each constituted by at least one frame, calculating statistical feature amounts for each scene, and encoding the input video signal using the encoded parameters.

Here, the statistical feature amounts are calculated by totaling the sizes and the distribution of motion vectors existing in each frame of the input signal for each scene. The encoded parameters include, for example, at least a frame rate and a quantization width.

In addition to totaling, as the statistical feature amounts, the sizes and distribution of the motion vectors existing in each frame for each scene, frames may be classified into types from the sizes and distribution of the motion vectors and based on the motion of a camera used when obtaining the input video signal and the motion of an object in a video to thereby classify the scenes according to the types of the frames, and the encoded parameters may be generated in view of the classification of the scenes.

If quantization widths in units of macro-blocks are generated as the encoded parameters, the quantization width of a macro-block, among the macro-blocks in a to-be-encoded frame, having the variance of luminance different from the variance of luminance of an adjacent macro-block by not less than a predetermined value and the quantization width of a macro-block in which the edge of an object exists may be made relatively small compared with the quantization widths of the other macro-blocks.

In this way, according to the present invention, the encoded parameters used for encoding the input video signal are generated for each scene based on the statistical feature amounts calculated for each scene of the input video signal, thereby making it possible to prevent the frame rate from decreasing when the motion of the object or that of the camera is active and the visual quality of a decoded video from deteriorating.

Further, the video feature amounts based on the motion of the object in the video, the motion of the camera and the like are reflected on the encoded parameters, based on which the frame rate is changed or the quantization width is changed for each macro-block, thereby making it possible to obtain a good decoded video unified for each scene even with the same number of generated bits.

Moreover, the present invention is applicable to a video encoding apparatus for encoding an input video signal of the same video file twice or more. That is, based on the statistical feature amounts calculated for each scene of the input video signal, the input video signal is encoded using the first encoded parameters generated for each scene to thereby determine whether the number of generated bits of a code string generated as a result of the first encoding exceeds or falls short of the target number of bits, the first encoded parameters are corrected based on the determination result to thereby provide second encoded parameters, the second encoding is conducted to the input video signal using the second encoded parameters to thereby generate a code string, and the code string is outputted as an encoded output.

As can be seen, the encoded parameters generated as stated above are corrected while always monitoring the number of generated bits, and encoding is repeated twice or more, whereby it is possible to realize encoding capable of obtaining a good decoded video with data size not more than the target number of bits.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiment of the present invention will be described hereinafter with reference to the accompanying drawings.

Figure 1:
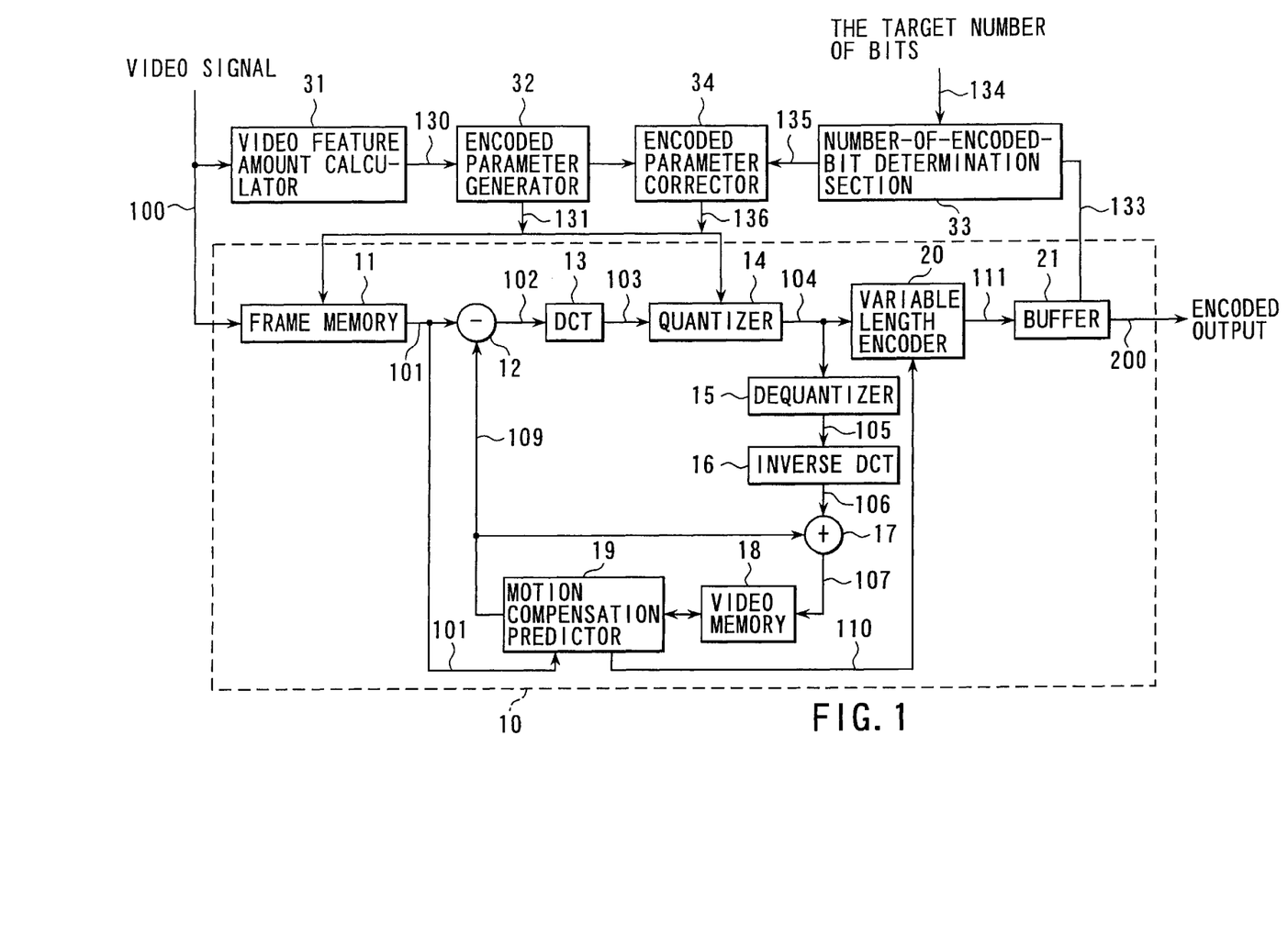
FIG. 1 is a block diagram showing the construction of a video encoding apparatus in one embodiment according to the present invention.

FIG. 1 is a block diagram showing the construction of a video encoding apparatus in one embodiment according to the present invention. As shown therein, an input video signal 100 is a video signal reproduced by a video recording/reproducing apparatus such as a digital VTR or a DVD system capable of repeatedly reproducing the same signal. The signal 100 is inputted into an encoder section 10. In this embodiment, the encoder section 10 is the same in construction as a video encoding apparatus based on the MPEG scheme.

In the encoder section 10, a video signal of a to-be-encoded frame selected from the input video signal 100 is first stored in a frame memory 11. The video signal 101 of the to-be-encoded frame read from the frame memory 11 is inputted into a subtracter 12 and a motion compensation predictor 19. The motion compensation predictor 19 includes therein a motion vector detector and generates a predictive signal 109 by making motion compensation prediction.

As a to-be-encoded frame, there are three types of pictures, i.e., an I picture, a P picture and a B picture. The motion compensation predictor 19 does not detect vectors if the to-be-encoded frame is an I picture, and outputs 0 as the predictive signal 109. If the to-be-encoded frame is a P picture or B picture, the predictor 19 detects motion vectors for each macro-block from the video signal 101 of the to-be-encoded frame and generates a predictive signal 109.

A motion vector is detected in units of macro-blocks between the video signal 101 of the to-be-encoded frame and a reference picture signal made up of a local decoded signal of a frame which has been already encoded and stored in a video memory 18. Specifically, the macro-block of the reference picture signal having the highest correlation with the macro-block of the picture signal 101 of the to-be-encoded frame is detected, thereby detecting information indicating from which macro-block of the reference picture signal, the macro-block of the video signal 101 has moved, as a motion vector.

The motion compensation predictor 19 makes a motion compensation of the reference picture signal by using this motion vector, and generates a predictive signal 109. Namely, the motion compensation predictor 19 selects a preferred predictive mode from a motion compensation inter-frame predictive mode and an intra-frame encoding mode (in which the predictive signal=0) in which the video signal 101 of the to-be-encoded frame is encoded as it is, and generates a predictive signal 109 corresponding to the selected predictive mode.

The subtracter 12 obtains the difference between the video signal 101 of the to-be-encoded frame and the predictive signal 109 from the motion compensation predictor 19, and generates a predictive error signal 102. This predictive error signal 102 is subjected to discrete cosine transformation (DCT) in units of blocks of certain size by a discrete cosine transformer 13. DCT coefficient data 103 obtained by the discrete cosine transformation is quantized by a quantizer 14. The DCT coefficient data quantized by the quantizer 14 is branched into two parts, i.e., one is inputted into a variable length encoder 20 and the other is dequantized by a dequantizer 15. The dequantized DCT coefficient data 105 is further subjected to inverse discrete cosine transformation (inverse DCT) by an inverse cosine transformer 16.

An output 106 from the inverse discrete cosine transformer 16 is added to the predictive signal 109 by an adder 17 to thereby provide a local decoded signal 107 and stored in the video memory 18 as a reference picture signal. The reference picture signal stored in the video memory 18 is read by the motion compensation predictor 19 and motion compensation inter-frame prediction is conducted.

Predictive mode/motion vector information 110 indicating the motion compensation predictive mode and the motion vector is also outputted from the motion compensation predictor 19 and inputted into the variable length encoder 20. The variable length encoder 20 conducts variable length encoding to the quantized DCT coefficient data 104 and the predictive mode/motion vector information 110, and outputs the code stream of the obtained variable length code (to be referred to as "encoded bit stream" hereinafter) 111. The encoded bit stream 111 is temporarily stored in a buffer 21.

In this embodiment, the same video file, i.e., the input video signal of the same content such as a movie is encoded twice according to the above-stated basic operation. Further, in this embodiment, a video feature calculator 31, an encoded parameter generator 32, a number-of-encoded-bit determination section 333 and an encoded parameter corrector 34 are provided. During the first encoding, video feature amounts are calculated and encoded parameters are set based on the video feature amounts thus calculated. During the second encoding, the number of generated encoded bits of the encoded bit stream 111 is determined and encoded parameters are corrected based on the number of generated encoded bits.

That is to say, during the first encoding, the source video signal 100 is inputted into the video feature calculator 31 before inputted into the frame memory 11. In the calculator 31, the statistical feature amounts of the video (to be referred to as "video feature amounts" hereinafter) are calculated. As will be described later in detail, the video feature amounts 130 are statistical feature amounts obtained by totaling at least the sizes and distributions of the motion vectors in the respective frames of the input video signal 100 for each scene. To calculate the video feature amounts 130, a frame having a sudden change in luminance is detected from the difference value between two successive frames of the input video signal 100. The detected frame is set as a leading frame of the delimitation of the scene. Later, the number of motion vectors, distribution thereof, sizes thereof, variance of luminance and chrominance and the like are calculated from the input video signal 100 for each frame and they are averaged for each scene, thereby obtaining the representative values of the feature amounts for each scene as video feature amounts 130.

Information on the video feature amounts 130 for each scene thus calculated is inputted into the encoded parameter generator 32. The encoded parameter generator 32 generates encoded parameters 131 to conduct encoding so that the data size of the encoded bit stream 111 generated in the variable length encoder 120 may become not more than a size designated by a user. By applying the video feature amounts 130 to an encoded parameter generation formula to be described later, the encoded parameters 131 are generated. The encoded parameters 131 obtained here are frame rate FR and quantization width QP.

During the first encoding, the video signal 101 of the to-be-encoded frame is selected from the input video signal 100 according to the value of the frame rate FR generated by the encoded parameter generator 32, and is stored in the frame memory 10. If this frame is I picture such as a picture at the delimitation of the scene, the detection of motion vectors is not conducted and intra-frame encoding is conducted. If it is P picture or B picture, inter-frame encoding is conducted based on the motion compensation prediction.

Furthermore, in any case of the intra-frame encoding and the inter-frame encoding, the DCT coefficient data 103 outputted from the discrete cosine converter 13 is quantized by the quantizer 14 according to the quantization width QP generated for each scene by the encoded parameter generator 32. The quantized DCT coefficient data 104 as well as the predictive mode/motion vector information 110 is encoded by the variable length encoder 20 as already stated above, combined with information on the quantization width QP and outputted as an encoded bit stream 111 to the buffer 21.

When the first encoding ends, the number-of-encoded-bit determination section 33 determines the shortage or excess of the number of generated bits 133 of the encoded bit stream 111 stored in the buffer 21. According to the determination result, the encoded parameters generated by the encoded parameter generator 32 are corrected by the encoded parameter corrector 34.

That is to say, if the number-of-encoded-bit determination section 33 determines that the difference between the number of generated bits 133 and the target number of bits 134 designated by the user exceeds a threshold, the encoded parameter corrector 34 corrects the encoded parameters so that the number of generated bits 133 are closer to the target number of bits 134. The second encoding is conducted according to the corrected encoded parameters 136. If the difference between the number of generated bits 133 and the target number of bits 134 becomes not more than the threshold as a result of the second encoding, the encoded bit stream stored in the buffer 21 is outputted as an encoded output 200. The encoded output 200 is fed to a transmission line or stored in a storage medium.

In the video encoding apparatus in this embodiment, the video feature amounts 130 calculated by the video feature amount calculator 31 as stated above is a value indicating how actively the picture on each scene moves and how fine the picture is. This amount is reflected on the encoded parameters 131 generated by the encoded parameter generator 32 or the encoded parameters 136 corrected by the encoded parameter corrector 34 and then encoding is carried out.

Figure 2:
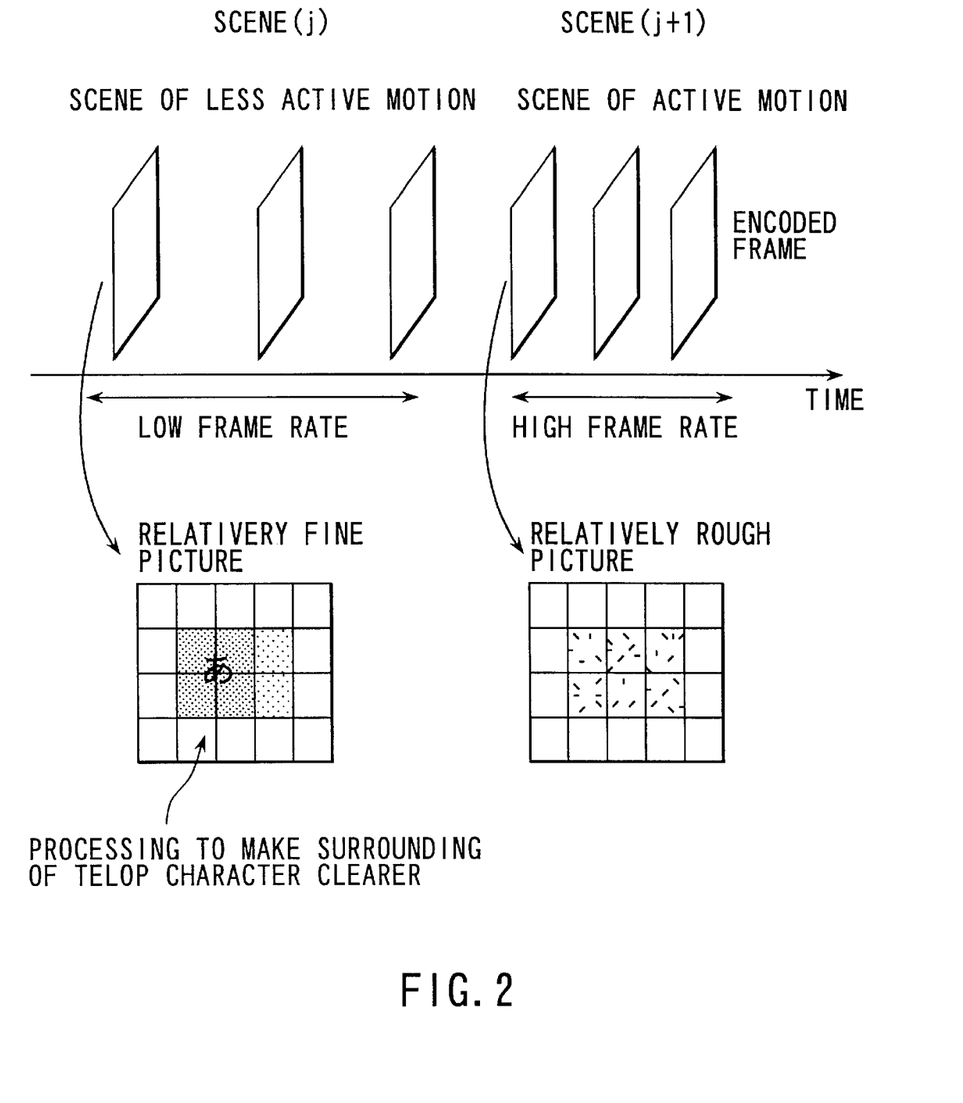
FIG. 2 shows an example of video encoding according to the content of a scene, for describing the outline of the embodiment.

As a result, as shown in FIG. 2, encoding can be conducted in accordance with the encoded parameters (frame rate and quantization width) suited for the content of each scene. Namely, on a scene having less motion (j), the frame rate is set low and the quantization width is changed among macro-blocks in the respective frames so as to obtain a relatively fine video, thereby making it possible to prevent the deterioration of the video in a region to which visual attention tends to be paid such as an object or a telop (superimposed dialogue).

Conversely, on a scene (j+1) having active motion, the frame rate and the quantization width are increased, thereby obtaining a decoded video with relatively natural motion. If the quantization width is increased, the decoded video becomes rougher. However, since the roughness of the video is not so conspicuous on a scene having active motion, it may be negligible.

Using the flow chart shown in FIG. 3, the processing procedures of the video encoding apparatus in this embodiment will be described.

First, a video signal 100 is inputted (in a step S11) and video feature amounts which are the statistical feature amounts of a video for each scene as stated above is calculated (in a step S12). This video feature amount calculation step S12 includes three processings, i.e., scene division, feature amount calculation and scene classification in this embodiment.

Next, encoded parameters are generated (in a step S13). This encoded parameter generation step S13 includes four processings, i.e., frame rate calculation, quantization width calculation, frame rate adjustment and quantization width setting for each macro-block.

Thereafter, the video signal is encoded according to the generated encoded parameters (in a step S14). The processing of this encoding step S14 is the same as that already stated above.

When the first encoding ends in the encoding step S14, the determination of the number of encoded bits, i.e., the determination as to whether the difference between the number of generated bits and the target number of bits is not more than a threshold is made (in a step S15).

If the determination result of the-number-of-encoded-bits calculation step S15 shows that the difference between the number of generated bits and the target number of bits exceeds the threshold, the encoded parameters are corrected so as to narrow the difference between the number of generated bits and the target number of bits (in a step S16). In the step S16, the second encoding is conducted.

If the determination result in the number-of-encoded-bit determination step S15 shows that the difference between the number of generated bits and the target number of bits is not more than the threshold, the encoded bit stream obtained in the encoding step S14 is outputted as encoded output data (in a step S17). Therefore, encoding may be conducted only once or twice or more.

Next, description will be given in more detail to the processings of the video feature calculator 31, the encoded parameter generator 32, the number-of-encoded-bit determination section 33 and the encoded parameter corrector 34 which are the characteristic elements of this embodiment.

The video feature calculator 31 first divides the video signal into scenes, calculates feature amounts and finally classifies scenes as described below.

Scene Division

The input video signal 100 is divided into a plurality of scenes except for frames such as frames whitened by flash light and noisy frames based on the differences between adjacent frames. Here, the whitened frame signifies, for example, an interview scene on a news program. This frame has an abrupt increase in brightness such as a moment that a flash (strobe flash) is emitted. The noisy frame signifies a frame in which the picture greatly deteriorates due to the vibration or the like of a camera. The concrete example of the scene division will be described while referring to the flow chart of FIG. 4 as well as FIGS. 5 and 6.

Figure 4:
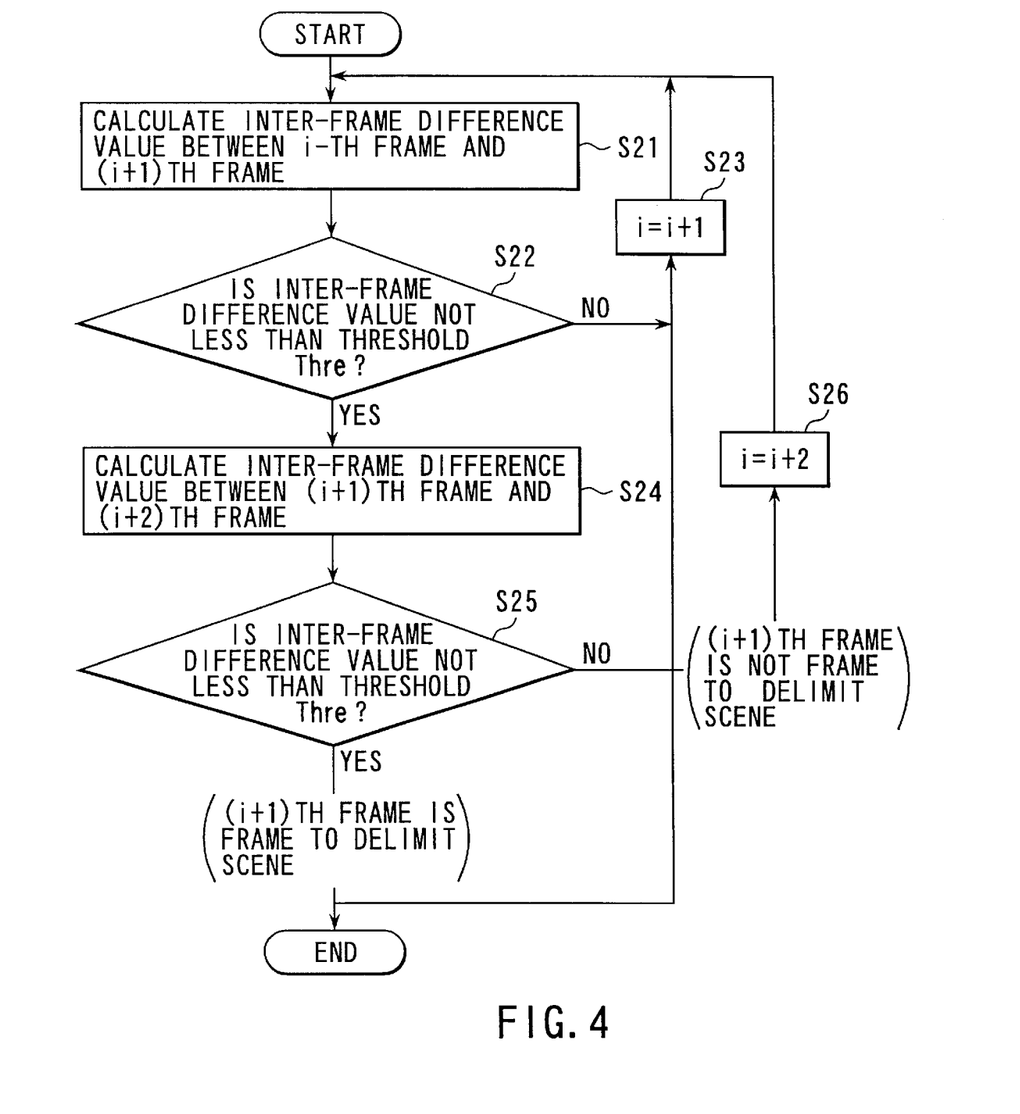
FIG. 4 is a flow chart showing processing procedures for scene division in the embodiment.

First, the difference value in brightness between the I-th frame and the (I+1)th frame (to be referred to as "difference between frames" hereinafter) is calculated (in a step S21). The difference between frames is compared with a certain threshold Thre preset by a user (in a step S22). If the comparison result shows that the difference between frames is below the threshold Thre, i is regarded as i=i+1 (in a step S23) and the processing returns to the step S21.

If the difference between the i-th frame and the (i+1)th frame is not less than the threshold Thre, the difference between (i+1)th frame and (i+2)th frame is calculated (in a step S24). This difference is compared with the threshold Thre as in the case of the step S22 (in a step S25).

If the comparison result in the step S25 shows that the difference is not less than the threshold Thre, i.e., if both the difference between the i-th frame and the (i+1)th frame and that between the (i+1)th frame and the (i+2)th frame are not less than the threshold Thre, it is judged that the i-th frame and the (i+1)th frame belong to different scenes and the (i+1)th frame is regarded to delimit a scene. That is, the i-th frame is set as an end frame of the scene and the (i+1)th frame is set as a leading frame of the scene.

Figure 6:
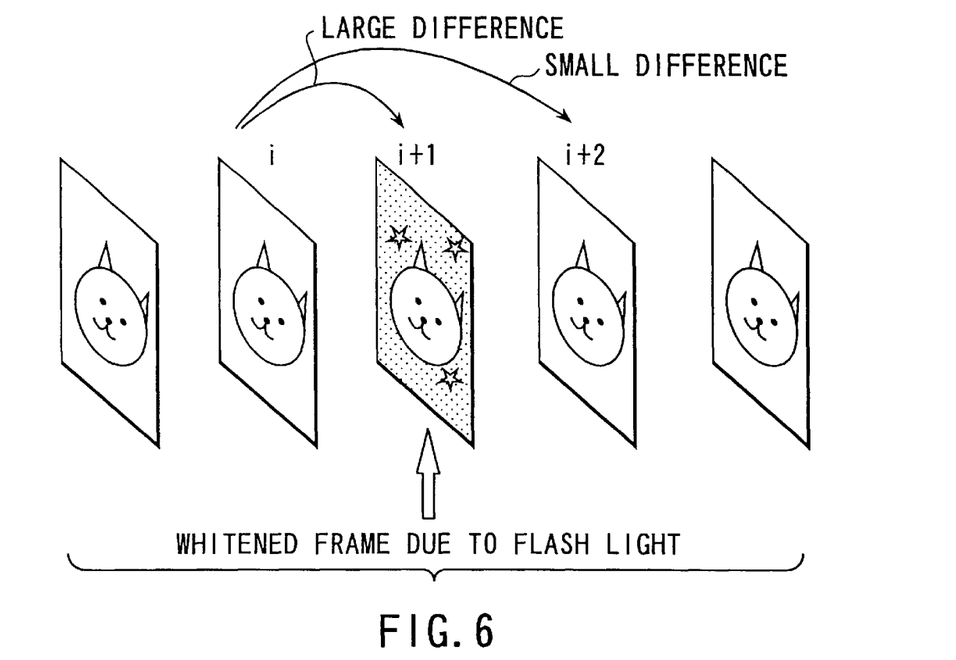
FIG. 6 is an explanatory view for flash frame determination operation in the embodiment.

On the other hand, if the comparison result in the step S25 shows that the difference between frames is below the threshold Thre, i.e., the difference between the i-th frame and the (i+1)th frame is not less than the threshold Thre but that between the (i+1)th frame and the (i+2)th frame is below the threshold Thre, then it is judged as shown in, for example, FIG. 6, that the (i+1)th frame is a whitened frame due to flash light (or noisy frame), the i-th, (i+1)th and (i+2)th frames belong to the same scene and that the (i+1)th frame is not one to delimit a scene, and i is regarded as i=i+2 (in a step S26). The processing then returns to the step S21.

Likewise, to deal with a picture and the like having many whitened frames due to flash light, the following method may be adopted to prevent misjudgment that a whitened frame is a frame to delimit a scene when there are k continuous flash frames.

Namely, if the differences between the i-th frame and the (i+1)th, (i+2)th, . . . (i+k )th frames are not less than the threshold Thre, respectively and the difference between the i-th frame and the (i+k+1)th frame is not less than the threshold Thre, then it is judged that the i-th frame and the (i+1)th frame belong to different scenes and the (i+1)th frame is a frame to delimit a scene.

Meanwhile, if the differences between the i-th frame and the (i+1)th, . . . (i+2)th, (i+k )th frames are not less than the threshold Thre, respectively and the difference between the i-th frame and the (i+k+1)th frame is below the threshold Thre, then it is judged that the (i+1)th, (i+2)th, (i+k )th and (i+k+1)th frames are whitened frames or noisy frames and that the i-th, . . . (i+k )th, (i+k+1)th frames belong to the same scenes. Thus, the (i+1)th frame is not regarded to delimit a scene.

It is preferable that a user can determine and set whether or not continuous whitened frames or noisy frames as described above are dealt with as frames to delimit a scene in advance.

Feature Amount Calculation

Next, video feature amounts, such as the number of macro-blocks in a frame in which motion vectors exist (the number of motion vectors is not zero (0)), the average of the sizes of motion vectors, and the variance of luminance and chrominance, are calculated for all frames of the input video signal 100. Here, the feature amounts are calculated only for the frames other than the frames which have been determined as either a frame to delimit a scene, a flash frame and a noise frame in the above-stated scene division. Further, the feature amounts are averaged for each of the scenes determined by the scene division and the average value is set as the representative value of the feature amounts of each scene.

Scene Classification

In this embodiment, the following scene classification is conducted using motion vectors besides the above-stated scene division and feature amount calculation.

After calculating motion vectors for the respective frames, the distribution of the motion vectors is obtained and scenes are classified. To be specific, the distribution of the motion vectors in one frame is calculated and it is checked which type shown in FIG. 7A, 7B, 7C, 7D or 7E each frame belongs to.

Figure 7A:
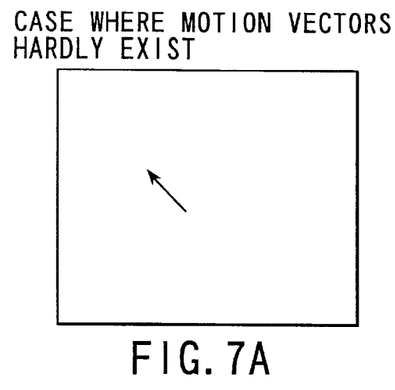
FIGS. 7A to 7E are explanatory views for frame type classification based on motion vectors in the embodiment.

FIG. 7A: Motion vectors hardly exist in a frame (the number of macro-blocks in which the number of motion vectors is not zero (0), is not more than Mmin).

Figure 7B:
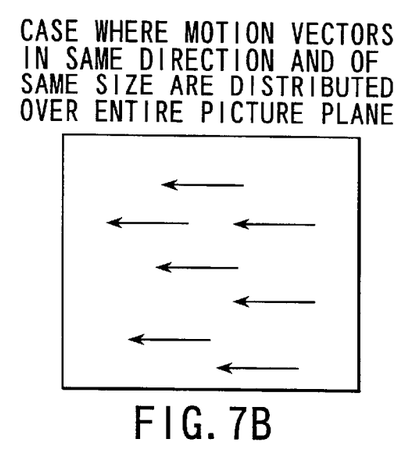

FIG. 7B: Motion vectors in the same direction and of the same size are distributed over an entire picture plane (the number of macro-blocks in which motion vectors appear is not less than Mmax and both the size and the direction fall within certain ranges).

Figure 7C:
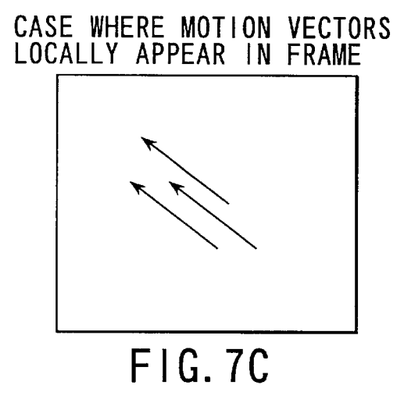

FIG. 7C: Motion vectors appear only in specific portions in a frame (the positions of macro-blocks in which motion vectors appear concentrate on certain portions).

Figure 7D:
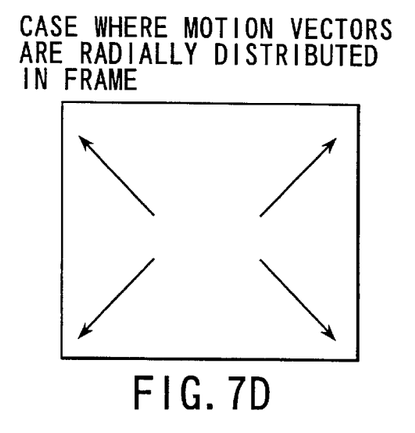

FIG. 7D: Motion vectors are radially distributed in a frame.

Figure 7E:
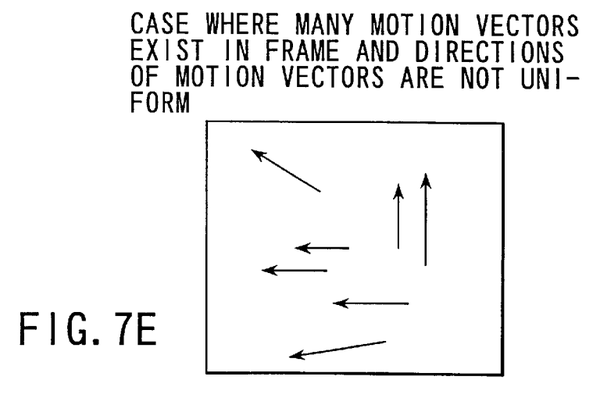

FIG. 7E: The number of motion vectors in a frame is large and the directions of the motion vectors are not uniform.

The cases shown in FIGS. 7A to 7E are closely related to the motion of a camera used when obtaining the input video signal 100 or the motion of an object in a captured picture. That is to say, in case of FIG. 7A, both the camera and the object are still. In case of FIG. 7B, the camera makes parallel translation. In case of FIG. 7C, the object is in motion in a still background. In case of FIG. 7D, the camera is zooming.

In case of FIG. 7E, both the camera and the object are in motion.

Next, after conducting classification as to which type shown in FIG. 7A, 7B, 7C, 7D or 7E described above each frame belongs to, scenes which frames are classified as described above are classified according to the type of the frames. Namely, it is determined that the respective frames belong to which type of frames shown in FIG. 7A, 7B, 7C, 7D or 7D. Using the determination result of classification for the scenes (type of frames constituting each scene) and the feature amounts as calculated above, the encoded parameter generator 32 determines the frame rate and the quantization width serving as encoded parameters for each scene as follows.

The encoded parameter generator 32 sequentially calculates a frame rate and a quantization width as shown below and corrects the frame rate and quantization width thus calculated. In addition, the encoded parameter generator 32 conducts a processing for changing the quantization width for each macro-block.

Frame Rate Calculation

First, the encoded parameter generator 32 determines a frame rate. It is assumed that the feature calculator 31 calculates the representative value of motion vectors as the representative value of feature amounts for each scene as already described above. For example, the representative value MVnum_j of the motion vectors of the (j)th scene is a value related to the average number of macro-blocks having a motion on the scene as shown in the following formula. That is, if the number of macro-blocks in which the number of motion vectors is not zero (0) in the i-th frame is MVnum(i), the representative value MVnu_m(i) is expressed as follows:

MVnum_j)=(Average of MVnum(i) of all frames included in the (j)th scene)×(Constant multiple)   (1).

Using the motion vector representative value MVnum_j of the (j)th scene, the frame rate FR (j) of the j-th scene is calculated using the following formula:

FR (j)=a×MVnum_j+b+w_FR   (2).

In the formula (2), $\underline{a}$ and $\underline{b}$ are coefficients for the bit rate or data size designated by a user and w_FR is a weight parameter to be described later.

The formula (2) signifies that if the motion vector representative value MVnum_j on the scene is higher, i.e., the motion is more active, the frame rate is set faster.

As the motion vector representative value MVnum_j, the absolute sum of the sizes of the motion vectors in a frame or density thereof may be used instead of the motion vectors in the frame.

Quantization Width Calculation

After the frame rate for each scene is calculated as described above, the quantization width is calculated for each scene. The quantization width QP (j) for the (j)th scene is, as in the case of the frame rate FR (j), calculated by the following formula while using the motion vector representative value MVnum_j on the scene:

QP (j)=c×MVnum_j 30 d+w_QP   (3).

In the formula (3), $\underline{c}$ and $\underline{d}$ are coefficients for the bit rate or the data size designated by a user and w_QP is a weight parameter to be described later.

The formula (3) signifies that if the motion vector representative value MVnum_j is higher, the quantization width QP (j) is set larger. That is, the quantization width is larger on a scene having an active motion. Conversely, the quantization width is set smaller on a scene having a less active motion. By doing so, a picture is made clearer. Correction of Frame Rate and Quantization Width After calculating the frame rate FR (j) for each scene as described above, the weight parameters w_FR and w_QP are added to the formulas (2) and (3), respectively and the frame rate and the quantization width are corrected using the scene classification result obtained by the processing of "scene classification" in the video feature amount calculator 31 (types of frames constituting each scene).

Namely, if the scene classification result corresponds to the case of FIG. 7A where motion vectors hardly exist in a frame, both the frame rate and the quantization width are decreased (both of the weight parameters w_FR and w_QP are increased). If corresponding to the case of FIG. 7B, the frame rate is increased as much as possible so that the motion of the camera may not become unnatural and the quantization width is increased (both of the weight parameters w_FR and w_QP are increased). In case of FIG. 7C, if the motion of a moving object, i.e., the size of motion vectors is large, the frame rate is corrected (weight parameter w_FR is increased). In case of FIG. 7D, since it appears that little attention is paid to the object while camera zooming, the quantization width is set large and the frame rate is increased as much as possible (both of the weight parameters w_FR and w_QP are increased). In case of FIG. 7E, both the frame rate and the quantization width are increased (both of the weight parameters w_FR and w_QP are increased).

By adding the weight parameters w_FR and w_QP thus set to the formulas (2) and (3), respectively, the frame rate and the quantization width are corrected.

Figure 5:
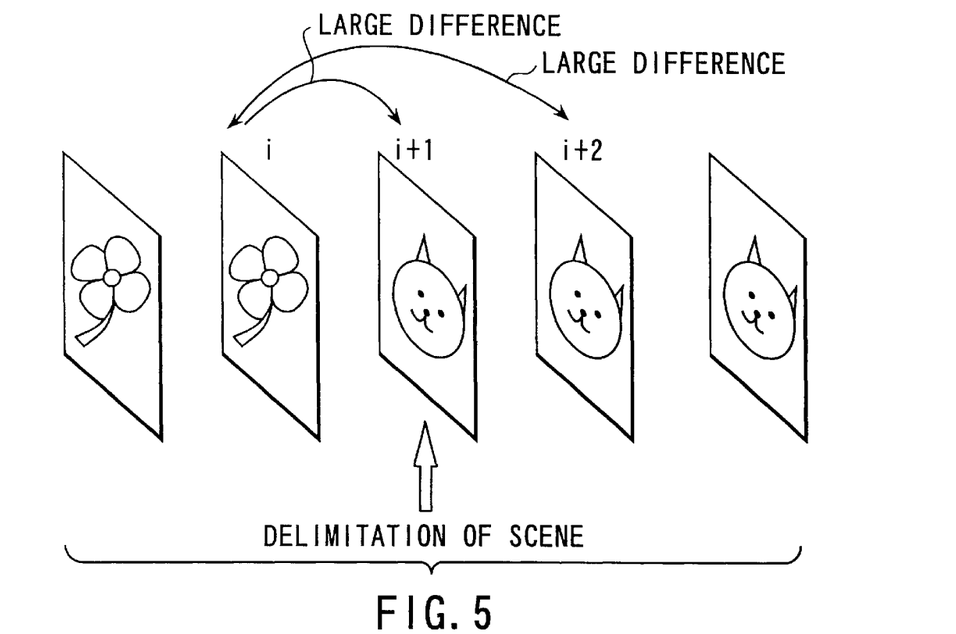
FIG. 5 is an explanatory view for the determination operation of determining a scene delimitation for making scene division in the embodiment.

In the procedures for the encoding processing (steps S11 to S15) shown in FIG. 5, if the user defines changing the quantization width for each macro-block, the quantization width of a macro-block which has been determined to tend to generate mosquito noise in a frame or a macro-block which has been determined to have a strong edge such as telop characters, is set relatively smaller than those of other macro-blocks, thereby partially improving picture quality.

Here, a method of further correcting the quantization width QP (j) obtained for each scene by the formula (5) will be described. As for the to-be-encoded frame, each macro-block is further divided into four blocks and the variance of luminance is calculated for each of the four blocks. If a block having large variance and a block having small variance are adjacent each other and the quantization width is large, mosquito noise tends to occur. That is, if a block of flat texture exists adjacent to a block of complex texture, mosquito noise tends to occur.

Considering this, if a block having the small variance of luminance is adjacent to a block having the large variance thereof, the quantization width of the former block is set smaller than the quantization width QP (j) generated as an encoded parameter as described above. Conversely, the quantization width of the block in which it is determined that mosquito noise does not tend to occur is set larger than the quantization width QP (j). By doing so, the increase of the number of generated bits is prevented.

Figure 8:
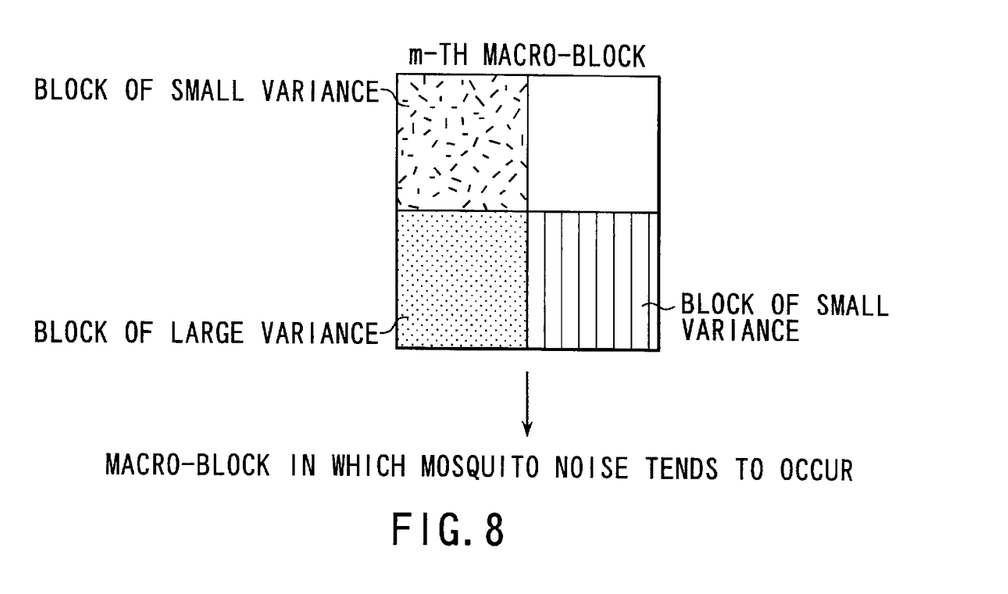
FIG. 8 is an explanatory view for the determination of a micro-block in which mosquito noise tends to occur in the embodiment.

It is assumed, for example, that the (m)th macro-block in the j-th frame has four small blocks. In this case, as shown in FIG. 8, if there is a small block satisfying the following combination:

Variance of luminance of block k≧MBVarThre, and Variance of luminance of block adjacent to block k<MBVarThre   (4), then it is determined that the (m)th block is a macro-block in which mosquito noise tends to occur. For such a macro-block in which mosquito noise tends to occur, the quantization width QP (j)_m thereof is set low as follows:

QP (j)_m=QP (j)−q1   (5).

On the other hand, for the macro-block in which it is determined that mosquito noise tends to occur, the quantization width thereof is increased as follows to thereby prevent the number of generated bits from increasing:

$$QP\ (j)\_(\text{MB in which noise tend to less occur}) = QP\ (j) + q2 \quad (6).$$

In the formula (4), MBVarThre is a threshold defined by the user. Symbol q1 in the formula (5) and q2 in the formula (6) are positive numbers and they satisfy QP (j)−q1≦ (minimum quantization width) and QP (j)+q2≦(maximum quantization width), respectively. As for a scene classified as a scene on which the camera makes parallel translation as shown in FIG. 7B and a scene on which camera is zooming as shown in FIG. 7D stated above, since it appears that visual attention is little paid to an object in a picture due to the motion of the camera, q1 and q2 are set low. As for a scene in which moving portions concentrate on a certain region, since it appears that visual attention is much paid to an object in the picture, q1 and q2 are set high.

Figure 9:
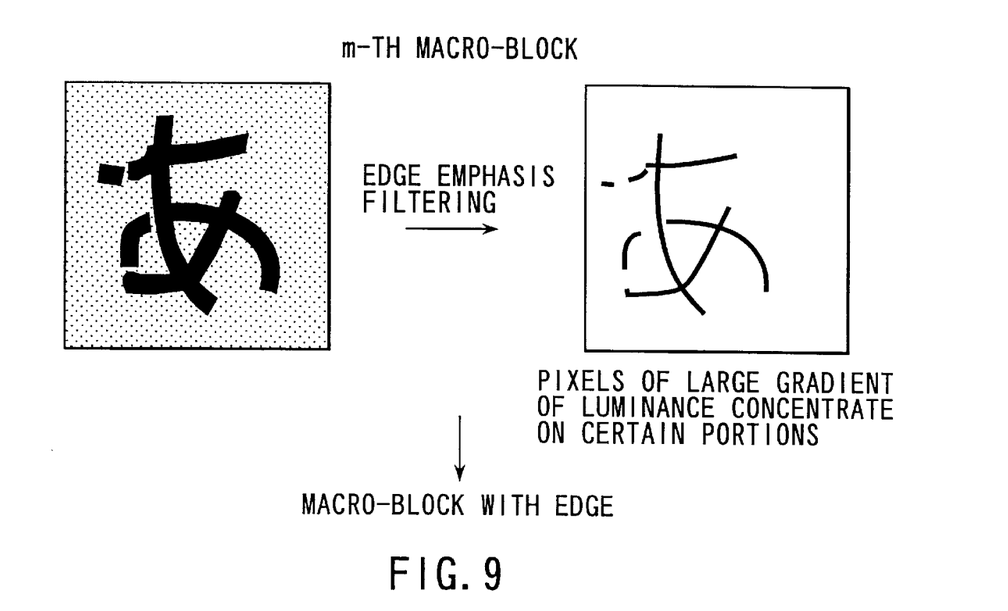
FIG. 9 is an explanatory view for the determination of a micro-block in which an edge exists in the embodiment.

As for a macro-block in which an edge such as a character exists, the quantization width is set small to thereby make the character portion clearer. Specifically, as shown in FIG. 9, edge emphasis filtering is conducted to luminance data on the frame so as to examine pixels having a high gradient of density values for each macro-block. The positions of the pixels having a high gradient of density values are totaled, thereby judging that the macro-block having partially concentrated pixels of high gradient is a macro-block in which an edge exists. Then, the quantization width of the macro-block is set small according to the formula (5) and those of the other macro-blocks are set large according to the formula (6).

The encoder section 10 conducts the same processing as that of a conventional video encoding apparatus based on the MPEG scheme. In this embodiment, the first encoding is conducted according to the encoded parameters generated by the encoded parameter generator 31 already described above. In that case, an individual scene thus divided is subjected to encoding basically at a fixed frame rate and with a fixed quantization width. Namely, as for the (j) th scene, the first frame (j_start) until the last frame (j_end) are encoded at the frame rate FR (j) and with the quantization width QP (j).

However, if the encoded parameter generator 31 conducts a processing for changing the quantization width for each macro-block as already described above, encoding is conducted with a quantization width set individually for each macro-width even in the same frame.

The number-of-encoded-bit determination section 33 compares the number of generated bits 133 of the encoded bit stream 111 outputted from the encoder section 10 with the target number of bits 134 as stated above. If the difference between the number of generated bits 133 and the target number of bits 134 exceeds a threshold, the number-of-encoded-bit determination section 33 issues a command to the encoded parameter corrector 34 to correct the encoded parameters. After correcting the encoded parameters, the encoder section 10 is controlled by a system control section, which is not shown in the drawings, so as to conduct the second encoding. If the number of generated bits 133 is not more than the target number of bits 134, the difference therebetween is not more than the threshold and these numbers are closer in a reasonable range, then the second encoding is ended and the encoded bit stream stored in the buffer 21 is fed as encoded output data to a transmission line or a storage medium.

The encoded parameter corrector 34 corrects the encoded parameters in response to the determination result of the number-of-encoded-bit determination section 33. For example, if the number of generated bits 133 is higher than the target number of bits 134, then the overall frame rates are decreased, the quantization width is decreased or the gradient given to the quantization width is set large. Giving a gradient to the quantization width intends to differentiate the quantization width depending on the positions of the macro-blocks in a frame such as setting the quantization widths of central macro-blocks in the frame large and setting those of peripheral macro-blocks small.

The correction of encoded parameters is realized by adding weights w_refFR and w_refQP to the frame rate FR (j) and the quantization width QP (j) generated by the encoded parameter generator 31, respectively. The corrected frame rate Fr' (j) and quantization width QP' (j) are expressed as follows:

$$Fr'(j) = FR\ (j) + w\_refFR \quad (7),\ \text{and}$$

$$QP'(j) = QP\ (j) + w\_refQP \quad (8).$$

In this way, the encoder section 10 conducts the second encoding using the frame rate Fr' (j) and the quantization width QP' (j) which are thus corrected.

Figure 3:
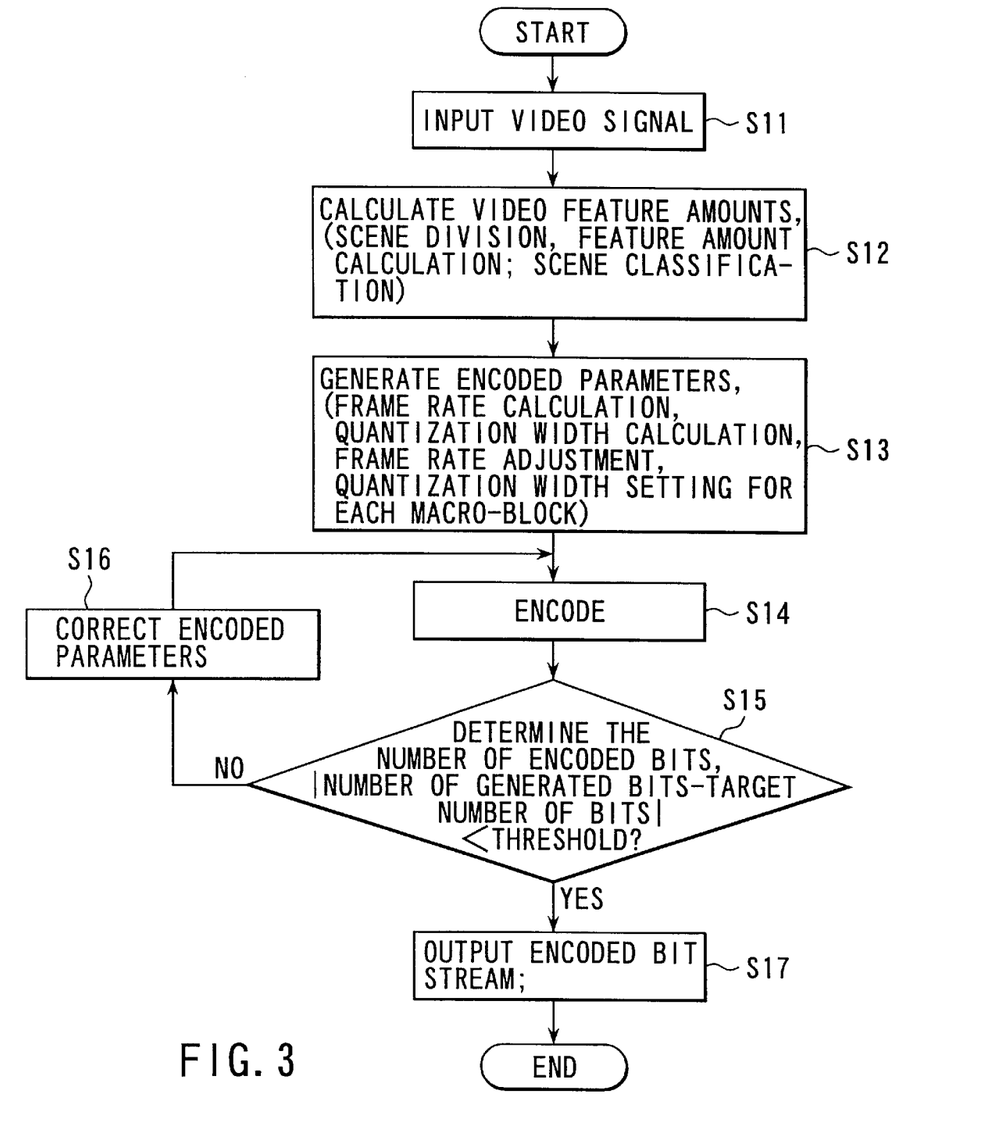
FIG. 3 is a flow chart showing encoding processing procedures in the embodiment.

Even after the second encoding is ended, if there remains such a large difference between the number of generated bits 131 and the target number of bits 134 as to exceed the threshold, the processing in the steps S14 to S16 shown in FIG. 3 is repeated while correcting the weights w_refFR and w_refQP. When the number of generated bits 133 finally becomes not more than the target number of bits 134 and close thereto in an almost reasonable range, the encoding is ended and encoded output data 200 is outputted.

In the above embodiment, description has been given to a case of conducting two-pass encoding. The present invention is also applicable to an ordinary video encoding apparatus in which the video signal of one video file is encoded only once.

Figure 10:
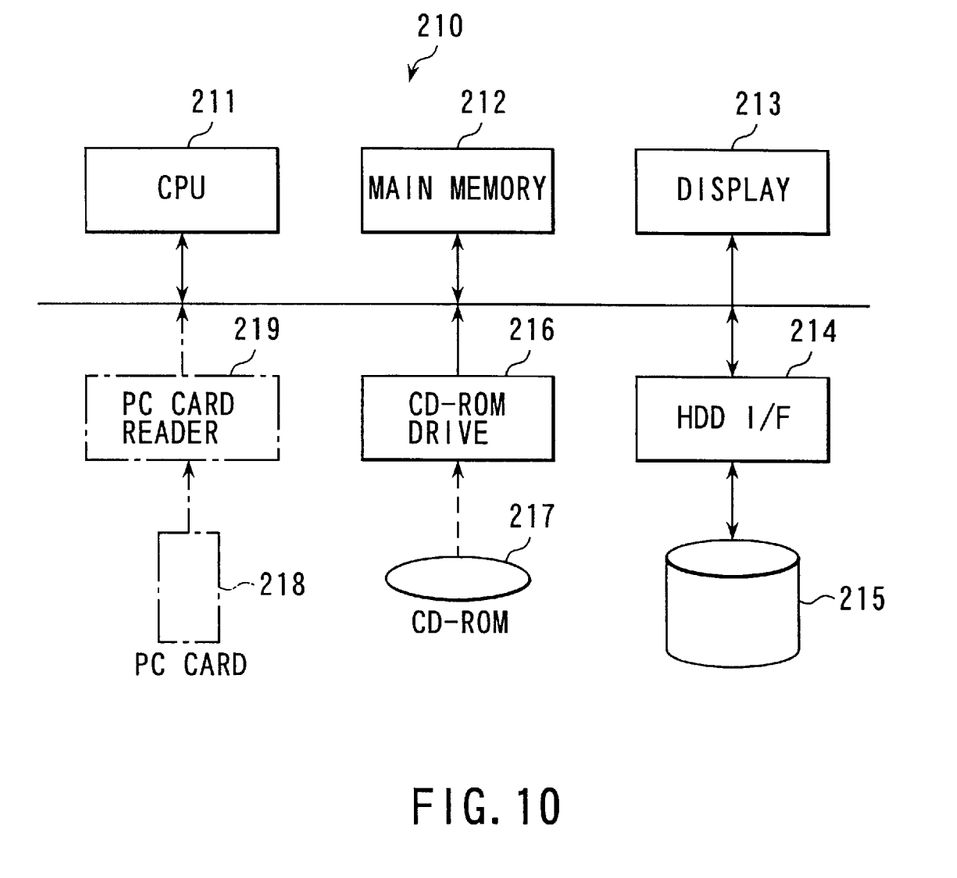
FIG. 10 shows a computer apparatus employing a recording medium in which a program for executing video encoding according to the present invention is stored.

FIG. 10 shows a computer apparatus employing a storage medium in which a program for executing video encoding is stored. As shown in FIG. 10, a personal computer 210 comprises a CPU 211, a main memory 212, a display 213, an HDD/IF 214, a hard disk 215 and a CD-ROM drive 216. A CD-ROM 217 storing therein a program for executing video encoding of the present invention is installed into the CD-ROM drive 215. If the program is read from the CD-ROM 217 through the CD-ROM drive 216 and transferred to the main memory 212, the CPU 211 executes the program, i.e., executes video encoding according to the flow charts of FIGS. 3 and 4.

If a PC card 218 is used as a storage medium, a video encoding program is read into the main memory 212 by a PC card reader 219 provided in the personal computer 210 and the CPU 211 executes video encoding according to the program.

As stated so far, according to the present invention, an input video signal is divided into temporally continuous scenes each consisting of at least one frame, calculates statistical feature amounts for each scene, generates encoded parameters for each scene based on the statistical feature amounts and encodes the input video signal. By doing so, a frame rate is set high on, for example, a scene having an active motion to make the motion of an object smooth, whereas quantization widths around an edge or a telop character (superimposed character) which tends to attract attention in a video are set low to allow the picture to be made clear.

Hence, the present invention can obtain a unified decoded picture for each scene compared with the conventional video encoding apparatus which takes little account of the motion of an object in a picture and/or the motion of a camera. Accordingly, the present invention can obtain a good picture improvement effect while keeping the encoded bit rate to a value designated according to the transmission rate of a transmission line, the capacity of a storage medium or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video encoding method comprising the steps of:

dividing an input video signal into a plurality of temporally continuous scenes each including at least one frame;

calculating statistical feature amounts for each of the scenes;

generating encoded parameters for each of the scenes based on said statistical feature amounts; and encoding the input image signal using the encoded parameters, wherein the step of calculating statistical feature amounts includes calculating, for all frames of each scene, video feature amounts including the number of macro-blocks in a frame in which motion vectors exist, an average of sizes of the motion vectors, and variance of luminance and chrominance.

2. A video encoding method comprising the steps of:

dividing an input video signal into a plurality of temporally continuous scenes each including at least one frame;

calculating statistical feature amounts for each of the scenes;

generating encoded parameters for each of the scenes based on said statistical feature amounts; and encoding the input image signal using the encoded parameters, wherein the step of calculating statistical feature amounts includes a step of classifying the plurality of scenes into a first scene on which motion vectors hardly exist in the frame, a second scene on which the motion vectors in same direction and with same size are distributed over an entire picture plane, a third scene on which the motion vectors appear on specific portions in the frame, a fourth scene on which the motion vectors are radially distributed in the frame, and a fifth scene on which many motion vectors exist and directions of the motion vectors are uneven; and a step of calculating feature amounts corresponding to said first to fifth scenes, respectively.

3. A video encoding method comprising the steps of:

dividing an input video signal into a plurality of temporally continuous scenes each including at least one frame;

calculating statistical feature amounts for each of the scenes;

generating encoded parameters for each of the scenes based on said statistical feature amounts; and encoding the input image signal using the encoded parameters;

wherein, the step of calculating statistical feature amounts includes detecting a specific frame having an abrupt change in luminance from a difference between frames of the input video signal to set the specific frame as a leading frame on a delimited scene, calculating feature amounts including the number of motion vectors, distribution thereof, sizes thereof, and variance of luminance and chrominance, and averaging the feature amounts for each scene to obtain an average value, and determining the average value as a representative value of the feature amounts for each scene, the representative value used as the statistical feature amounts.

4. A video encoding method comprising the steps of:

dividing an input video signal into a plurality of temporally continuous scenes each including at least one frame;

calculating statistical feature amounts for each of the scenes;

generating encoded parameters for each of the scenes based on said statistical feature amounts; and encoding the input image signal using the encoded parameters, wherein the step of calculating statistical feature amounts includes a scene division step in which if inter-frame difference values between the i-th frame and (i+1)th, (i+2)th to (i+k)th frames are not less than a threshold, respectively and an inter-frame difference value between the i-th frame and the (i+k+1)th frame is not less than the threshold, then it is determined that the i-th frame and the (i+1)th frame belong to different scenes and that the (i+1)th frame is a frame to delimit a scene, and if inter-frame difference values between the i-th frame and the (i+1)th, (i+2)th to (i+k)th frames are not less than the threshold, respectively and the inter-frame difference value between the i-th frame and the (i+k+1)th frame is less than the threshold, then it is determined that the i-th frame and the (i+1)th frame belong to a same scene and that the (i+1)th frame is not a frame to delimit a scene.

5. A video encoding method comprising the steps of:

dividing an input video signal into a plurality of temporally continuous scenes each including at least one frame;

calculating statistical feature amounts for each of the scenes;

generating encoded parameters for each of the scenes based on said statistical feature amounts; and encoding the input image signal using the encoded parameters, wherein the step of encoding the input signal includes a step of selecting a to-be-encoded frame from the input video signal according to the frame rate generated in the step of generating encoded parameters, if the to-be-encoded frame is an I picture to delimit a scene, motion vector detection is not conducted but intra-frame encoding is conducted, and if the to-be-encoded frame is one of a P picture and a B picture, inter-frame encoding is conducted based on motion compensation prediction.

6. A video encoding method comprising the steps of:

dividing an input video signal into a plurality of temporally continuous scenes each including at least one frame;

calculating statistical feature amounts for each of the scenes;

generating encoded parameters for each of the scenes based on said statistical feature amounts; and encoding the input image signal using the encoded parameters, wherein the step of encoding includes first encoding conducted according to the encoded parameters and second encoding conducted according to the corrected encoded parameters, when the first encoding ends, it is determined excess or shortage of the number of generated bits with respect to the target number of bits, the encoded parameters are corrected according to a determination result, and when a difference between the number of generated bits and the target number of bits becomes not more than a threshold as a result of the second encoding, encoded output data is outputted.

7. A video coding apparatus comprising:

a feature amount calculation section configured to divide an input video signal into a plurality of temp orally continuous scenes each consisting of at least one frame, and calculate statistical feature amounts for each scene;

an encoded parameter generation section configured to generate encoding parameters for each of the scenes based on the statistical feature amounts calculated by the feature amount calculation section; and an encoding section configured to encode the input video signal using the encoded parameters, wherein the feature amount calculation section includes a section configured to total at least sizes and a distribution of motion vectors existing in each frame of the input video signal for each scene to be set as the statistical feature amounts.

8. A video coding apparatus comprising:

a feature amount calculation section configured to divide an input video signal into a plurality of temporally continuous scenes each consisting of at least one frame, and calculate statistical feature amounts for each scene;

an encoded parameter generation section configured to generate encoding parameters for each of the scenes based on the statistical feature amounts calculated by the feature amount calculation section; and an encoding section configured to encode the input video signal using the encoded parameters, wherein the feature amount calculation section includes a section configured to total at least sizes and a distribution of motion vectors existing in each frame of the input video signal to be set as the statistical feature amounts, and a section configured to classify frames into types from the sizes and distribution of the motion vectors based on a motion of a camera used when obtaining the input video signal and a motion of an object in a video to thereby classify the plurality of scenes according to the types of the frames; and the encoded parameter generation section includes a section configured to generate the encoded parameters in view of classification of the scenes.

9. A video encoding apparatus comprising:

a feature amount calculation section configured to divide an input video signal into a plurality of temporally continuous scenes each including at least one frame, and calculate statistical feature amounts for each scene;

an encoded parameter generation section configured to generate first encoded parameters for each of the scenes based on the statistical feature amounts calculated by said feature amount calculation section;

an encoding section configured to encode the input video signal using either the encoded parameters or second encoded parameters corrected from the first encoded parameters, thereby generating a code string;

a determination section configured to determine an excess or a shortage of the number of generated bits of the code string generated when the encoding section encodes the input video signal according to the first encoded parameters with respect to the target number of bits;

an encoded parameter correction section configured to correct the first encoded parameters based on a determination result of the determination section, for obtaining the second encoded parameters; and an output section configured to output a code string generated when the encoding section encodes said input video signal according to said second encoded parameters, as encoded output, wherein the feature amount calculation section includes a section configured to total at least sizes and a distribution of motion vectors existing in each frame of the input video signal for each scene to be set as the statistical feature amounts.

10. A video encoding apparatus comprising:

a feature amount calculation section configured to divide an input video signal into a plurality of temporally continuous scenes each including at least one frame, and calculate statistical feature amounts for each scene;

an encoded parameter generation section configured to generate first encoded parameters for each of the scenes based on the statistical feature amounts calculated by said feature amount calculation section;

an encoding section configured to encode the input video signal using either the encoded parameters or second encoded parameters corrected from the first encoded parameters, thereby generating a code string;

a determination section configured to determine an excess or a shortage of the number of generated bits of the code string generated when the encoding section encodes the input video signal according to the first encoded parameters with respect to the target number of bits;

an encoded parameter correction section configured to correct the first encoded parameters based on a determination result of the determination section, for obtaining the second encoded parameters; and an output section configured to output a code string generated when the encoding section encodes said input video signal according to said second encoded parameters, as encoded output, wherein the feature amount calculation section includes a section configured to total at least sizes and a distribution of motion vectors existing in each frame of said input video signal to be set as the statistical feature amounts, and a section configured to classify frames into types from the sizes and distribution of the motion vectors based on a motion of a camera used when obtaining the input video signal and a motion of an object in a video to thereby classify the plurality of scenes according to the types of the frames; and said encoded parameter generation section includes a section configured to generate the encoded parameters in view of classification of the scenes.

11. A video encoding apparatus comprising:

a feature amount calculation section configured to divide an input video signal into a plurality of temporally continuous scenes each including at least one frame, and calculate statistical feature amounts for each scene;

an encoded parameter generation section configured to generate first encoded parameters for each of the scenes based on the statistical feature amounts calculated by said feature amount calculation section;

an encoding section configured to encode the input video signal using either the encoded parameters or second encoded parameters corrected from the first encoded parameters, thereby generating a code string;

a determination section configured to determine an excess or a shortage of the number of generated bits of the code string generated when the encoding section encodes the input video signal according to the first encoded parameters with respect to the target number of bits;

an encoded parameter correction section configured to correct the first encoded parameters based on a determination result of the determination section, for obtaining the second encoded parameters; and an output section configured to output a code string generated when the encoding section encodes said input video signal according to said second encoded parameters, as encoded output, wherein the encoded parameter generation section includes a section configured to make a quantization width of a macro-block, among macro-blocks in the frame encoded by the encoding section, having variance of luminance different from variance of luminance of an adjacent macro-block by not less than a predetermined value and a quantization width of a macro-block in which an edge of an object exists, relatively smaller than quantization widths of the other macro-blocks.

* * * * *